Patented Mar. 7, 1939

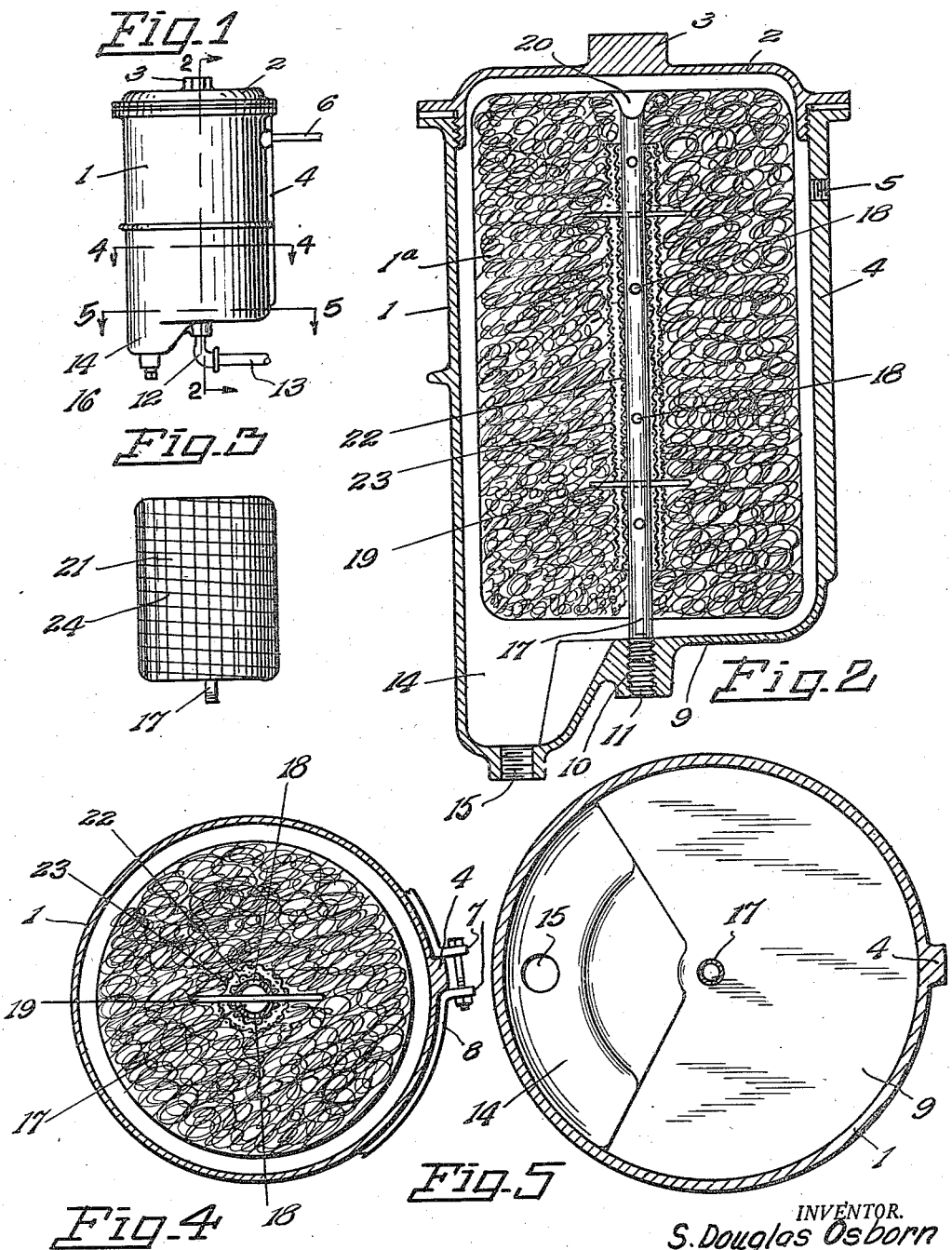

2,149,745

UNITED STATES PATENT OFFICE 2,149,745

FILTER

Stanley Douglas Osborn and Otto Dahl, Spokane, Wash.

Application February 10, 1938, Serial No. 189,842

1 Claim. (Cl. 210—131)

This invention relates to an oil filter and more particularly to a filter adapted to be interposed in the oil line of an automobile engine or similar motor, whereby dirt, carbon, fine pieces of metal and other foreign matter may be removed from lubricating oil as it is withdrawn from the sump of the engine for distribution to the bearings of the engine. By so cleansing the oil it will be maintained free from impurities and in condition for use and frequent replenishing of oil and damage to the moving parts of the engine will be avoided.

It is another object of the invention to provide a filter of this character wherein the oil is fed into a casing and after passing through a mass of waste serving as a filtering medium, through a tube to a discharge port from which leads a pipe for delivering the oil to the bearings of the engine.

Another object of the invention is to provide improved means for preventing clogging of inlet perforations formed in the tube and to also provide means for supporting the waste about the perforated tube and thus prevent the waste from settling when saturated and either exposing portions of the perforated tube or forming a dense mass through which oil cannot easily pass.

Another object of the invention is to provide a casing having its bottom formed with a dirt receiving pocket or well wherein the dirt and other foreign matter may accumulate and be held until removed through a drain opening at the bottom of the well.

Another object of the invention is to so form the casing that a top or cap for the same may be removed and the waste removed and the outlet tube then easily removed for cleaning and replacement without removing the casing from the oil line of the motor.

The invention is illustrated in the accompanying drawing, wherein:

Fig. 1 is a side elevation of the improved filter.

Fig. 2 is a sectional view on an enlarged scale taken vertically through the filter upon the line 2—2 of Fig. 1.

Fig. 3 is a view in side elevation of the filtering medium when removed from the casing of the filter.

Fig. 4 is a sectional view taken transversely through the filter along the line 4—4 of Figure 1.

Fig. 5 is a sectional view taken transversely through the lower end portion of the filter along the line 5—5 of Figure 1.

This improved oil filter has a cylindrical casing 1 formed of strong metal and open at its top, the upper end of the casing being, however, normally closed by a cap 2 which has threaded engagement with walls of the casing and is provided with a wrench engaging lug 3 in order that the cap may be screwed tightly into place and easily removed. A portion of the walls of the casing is externally thickened to form a rib 4 through which a threaded inlet opening 5 is formed to receive a pipe 6 through which oil is delivered to the filter. Referring to Fig. 4 it will be seen that by disposing the rib 4 between ears 7 of a clamp 8 the casing will be prevented from turning in the clamp and the filter will be firmly supported in position for use, it being understood that the clamp will be secured to a suitable support in a conventional manner.

The bottom 9 of the casing is formed with a depending boss 10 at its center through which a threaded opening 11 is formed and into the lower portion of this opening is screwed an elbow or coupling 12 engaged by a pipe 13 through which cleaned oil flows to the engine. A portion of the bottom is depressed to form a well or cup 14 in which dirt and other foreign matter collects as it works downwardly to the bottom of the casing and, in order that the dirt may be drained out of the well, there has been provided a drain opening 15 normally closed by a plug 16.

An outlet tube 17 extends vertically in the casing centrally thereof and has a threaded lower end portion which is screwed into the upper end of the opening 11. This tube has a number of perforations 18 formed therein in opposed relation to each other with certain of the openings extending at right angles to the other openings, as shown in Fig. 4, and referring to this figure and Fig. 2, it will be seen that through certain of the openings are passed thin rods or pins 19 which project from opposite sides of the tube and serve a purpose to be hereinafter set forth. The upper end of the tube is pinched together, as shown at 20, to close the tube at its top. It will thus be seen that oil must enter the tube through the perforations 18 and, therefore, the oil will flow through the casing at such a rate of speed that the dirt will all be removed from the oil.

The dirt and other foreign matter is removed from the oil by the mass of filtering material 21 which may be cotton waste or a similar material which is sufficiently porous to permit oil to pass through it but at the same time sufficiently dense to prevent passage of dirt, carbon, metal particles and other foreign matter in the oil. The outlet tube 17 forms a core for the filtering mass and in order to prevent the cotton waste from clogging the perforations 18, there has been provided screening 22 and 23, the screen 22 fitting closely about the tube and the screen 23 being spaced from the tube in concentric relation thereto as shown in Figs. 2 and 4. By providing a plurality of screens or sleeves of screening, any waste which may force its way through the outer sleeve 23 will be stopped by the inner sleeve and prevented from reaching the perforations 18. The rods or pins 19 pass through the sleeves and are embedded in the mass of filtering material 21. Therefore, these pins will serve very effectively to support the sleeves and the filtering material in their proper positions about the outlet tube and not only prevent the filtering material from settling in the casing and becoming too compact or exposing certain of the up ones of the perforations 18, but also prevent the sleeves and the filtering material from turning about the tube and working loose as the tube is screwed into the opening 11. A binding 24 of string is provided about the mass of filtering material to hold it in place about the screens and prevent it from expanding and working loose.

When this filter is in use, it is installed in the pipe line formed by the pipes 6 and 13, between the oil pump and the bearings to be lubricated and as the oil is forced toward the bearings it enters the casing through the pipe 6 and, after passing through the filtering material 21, enters the tube 17 and from this tube flows through the pipe 13 to the bearings. As the oil passes through the filtering material, all foreign matter will be stopped and either held in the waste or gradually work downwardly to the bottom of the casing and accumulate in the well 14. Only clean oil will reach the tube 17 and, therefore, clean oil will be delivered to the bearings. This will reduce wear upon the bearings and cause the bearings to be properly lubricated and the engine will run freely.

When it is desired to clean the filter, the cap 2 is unscrewed from the casing and the tube may then be grasped by its flattened upper end and unscrewed from the outlet opening 11. The mass of waste will then be removed from the casing with the tube and may then be cleaned and replaced or discarded and a new tube having waste about it used. After the tube and waste have been removed the plug 16 will be unscrewed from the drain opening and dirt allowed to pass out of the well and, if necessary, coal oil, gasoline or the like may be employed to thoroughly cleanse the interior of the casing before the new tube and waste are thrust into the casing and the lower end of the tube screwed into the opening 11. The plug will then be screwed back into the drain opening 15 and upon replacing the cap 2 the filter will be ready for use.

Having thus described the invention, what is claimed is:

A filter comprising a casing having a side opening adjacent its upper end constituting an inlet and an outlet through its bottom, the bottom of the casing being formed with a well having a drain opening at its bottom, a removable closure for the drain opening, an outlet tube extending vertically in said casing and having its lower end screwed into the outlet opening of the casing and its upper end pinched together to close the upper end of the tube and provide a portion adapted to be grasped when screwing the tube into place, said tube being formed with opposed perforations constituting inlets, sleeves of screening about said tube, pins passed through certain of the opposed openings of said tube with their end portions protruding from opposite sides of the tube and through said sleeves, a mass of waste about the tube and sleeves with end portions of said pins embedded therein to maintain the waste in its proper position, and a binding about the mass of waste.

S. DOUGLAS OSBORN.
OTTO DAHL.